United States Patent
Kaneko et al.

(10) Patent No.: US 9,982,318 B2
(45) Date of Patent: *May 29, 2018

(54) HIGH-STRENGTH GALVANIZED STEEL SHEET HAVING EXCELLENT FORMABILITY AND CRASHWORTHINESS AND METHOD OF MANUFACTURING THE SAME

(71) Applicant: JFE Steel Corporation, Tokyo (JP)

(72) Inventors: Shinjiro Kaneko, Hiroshima (JP); Tatsuya Nakagaito, Chiba (JP); Hiroshi Hasegawa, Hiroshima (JP); Yasunobu Nagataki, Hiroshima (JP)

(73) Assignee: JFE Steel Corporation (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/405,819

(22) Filed: Jan. 13, 2017

(65) Prior Publication Data

US 2017/0130293 A1    May 11, 2017

Related U.S. Application Data

(62) Division of application No. 13/640,851, filed as application No. PCT/JP2011/059453 on Apr. 11, 2011, now Pat. No. 9,617,630.

(30) Foreign Application Priority Data

Apr. 16, 2010  (JP) ................. 2010-094667

(51) Int. Cl.
| | | |
|---|---|---|
| *C21D 9/46* | (2006.01) | |
| *C23C 2/06* | (2006.01) | |
| *B32B 15/01* | (2006.01) | |
| *C23C 2/28* | (2006.01) | |
| *C23C 2/40* | (2006.01) | |
| *C21D 8/02* | (2006.01) | |
| *C21D 1/34* | (2006.01) | |
| *C22C 18/04* | (2006.01) | |
| *C22C 38/38* | (2006.01) | |
| *C22C 38/32* | (2006.01) | |
| *C22C 38/28* | (2006.01) | |

(Continued)

(52) U.S. Cl.
CPC .............. *C21D 9/46* (2013.01); *B32B 15/013* (2013.01); *C21D 1/34* (2013.01); *C21D 8/0226* (2013.01); *C21D 8/0236* (2013.01); *C21D 8/0263* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/28* (2013.01); *C22C 38/32* (2013.01); *C22C 38/38* (2013.01); *C23C 2/06* (2013.01); *C23C 2/285* (2013.01); *C23C 2/40* (2013.01)

(58) Field of Classification Search
CPC . B21C 37/08; B21C 37/0811; B21C 37/0815; B21D 22/16; B21D 35/005; B21D 5/015; B21D 5/10; B23K 10/02; B23K 2201/06; B23K 2203/05; B23K 26/14; B23K 26/262; B23K 26/32; B23K 31/027; B23K 9/0253; B23K 9/167; B23K 9/173; B23K 9/23; C21D 6/004; C21D 6/005; C21D 8/105; C21D 9/085; C22C 19/055; C22C 19/056; C22C 19/058; C22C 38/001; C22C 38/04; C22C 38/42; C22C 38/44; C22C 38/58; C22F 1/002; C22F 1/10; C22F 1/183; F16L 9/02; F16L 9/17
See application file for complete search history.

(56) References Cited

U.S. PATENT DOCUMENTS

| | | |
|---|---|---|
| 2009/0095383 A1 | 4/2009 | Teramoto et al. |
| 2009/0297387 A1 | 12/2009 | Chin et al. |

(Continued)

FOREIGN PATENT DOCUMENTS

| | | |
|---|---|---|
| EP | 1 096 029 A1 | 5/2001 |
| EP | 2 105 514 A1 | 9/2009 |

(Continued)

OTHER PUBLICATIONS

Supplementary European Search Report dated Sep. 22, 2015 of corresponding European Application No. 11768973.7.

*Primary Examiner* — Jenny R Wu
(74) *Attorney, Agent, or Firm* — DLA Piper LLP

(57) ABSTRACT

A galvanized steel sheet has formability and crashworthiness, consists of 0.03% to 0.13% C, 1.0% to 2.0% Si, 2.4% to 3.5% Mn, 0.001% to 0.05% P, 0.0001% to 0.01% S, 0.001% to 0.1% Al, 0.0005% to 0.01% N, and 0.0003% to 0.01% B on a mass basis; and optionally contains at least one selected from the following A-C: A: at least one selected from the group consisting of 0.0005% to 0.1% Ti and 0.0005% to 0.05% Nb on a mass basis; B: at least one selected from the group consisting of 0.01% to 1.0% Mo, 0.01% to 2.0% Ni, and 0.01% to 2.0% Cu on a mass basis; and C: 0.001% to 0.005% Ca on a mass basis; the remainder being Fe and unavoidable impurities, and a microstructure containing a tempered martensitic phase and a bainitic phase such that the sum of an area fraction of the tempered martensitic phase and an area fraction of the bainitic phase is 30% or more, the area fraction of the tempered martensitic phase is 30% or more in the absence of the bainitic phase, wherein a distance of closest approach of the tempered martensitic phase is 10 μm or less and contents of C, Mn, and B satisfy (1):

(% Mn)+1000×(% B)≥35×(% C)    (1).

5 Claims, No Drawings

(51) Int. Cl.

| | | |
|---|---|---|
| C22C 38/22 | (2006.01) | |
| C22C 38/16 | (2006.01) | |
| C22C 38/14 | (2006.01) | |
| C22C 38/12 | (2006.01) | |
| C22C 38/08 | (2006.01) | |
| C22C 38/06 | (2006.01) | |
| C22C 38/04 | (2006.01) | |
| C22C 38/02 | (2006.01) | |
| C22C 38/00 | (2006.01) | |

(56) References Cited

U.S. PATENT DOCUMENTS

| | | |
|---|---|---|
| 2010/0218857 A1 | 9/2010 | Nakagaito et al. |
| 2010/0314009 A1 | 12/2010 | Kaneko et al. |
| 2011/0030854 A1 | 2/2011 | Matsuda et al. |
| 2011/0036465 A1 | 2/2011 | Kawasaki et al. |

FOREIGN PATENT DOCUMENTS

| | | |
|---|---|---|
| JP | 9-13147 A | 1/1997 |
| JP | 11-279691 A | 10/1999 |
| JP | 2001-207235 A | 7/2001 |
| JP | 2002-69574 A | 3/2002 |
| JP | 2003-55751 A | 2/2003 |
| JP | 2003-105485 A | 4/2003 |
| JP | 2004-359973 A | 12/2004 |
| JP | 2007-92131 A | 4/2007 |
| JP | 2009-144225 A | 7/2009 |
| JP | 2009-149937 A | 7/2009 |
| JP | 2009-179852 A | 8/2009 |
| JP | 2009-263686 A | 11/2009 |
| WO | 2004/104256 A1 | 12/2004 |
| WO | 2009/054539 A1 | 4/2009 |
| WO | 2009/096115 A1 | 8/2009 |
| WO | 2009/096596 A1 | 8/2009 |
| WO | 2009/099251 A1 | 8/2009 |

HIGH-STRENGTH GALVANIZED STEEL SHEET HAVING EXCELLENT FORMABILITY AND CRASHWORTHINESS AND METHOD OF MANUFACTURING THE SAME

RELATED APPLICATIONS

This is a divisional of U.S. application Ser. No. 13/640,851, filed Oct. 12, 2012, which is a § 371 of International Application No. PCT/JP2011/059453, with an international filing date of Apr. 11, 2011 (WO 2011/129452 A1, published Oct. 20, 2011), which is based on Japanese Patent Application No. 2010-094667, filed Apr. 16, 2010, the subject matter of which is incorporated by reference.

TECHNICAL FIELD

This disclosure relates to high-strength galvanized steel sheets having excellent formability principally suitable for structural parts of automobiles and particularly relates to a high-strength galvanized steel sheet having a tensile strength TS of 980 MPa or more, excellent formability including stretch flangeability, and excellent energy absorption during high-speed deformation and a method of manufacturing the same.

BACKGROUND

In recent years, high-strength steel sheets having a TS (tensile strength) of 980 MPa or more and a small thickness have been actively used for structural parts of automobiles for the purpose of ensuring the crash safety of occupants and for the purpose of improving fuel efficiency by automotive lightening. However, the increase in strength of steel sheets usually leads to a reduction in stretch flangeability or bendability of the steel sheets. Therefore, there are increasing demands for steel sheets having high strength and excellent formability. Furthermore, the reduction in ductility of steel sheets due to the increase in strength thereof impairs plastic deformability during crashes and therefore leads to the reduction of energy absorption. Hence, an improvement in energy absorption during high-speed deformation is desired.

To cope with such demands, for example, Japanese Unexamined Patent Application Publication No. 9-13147 discloses a high-strength galvannealed steel sheet which has a TS of 800 MPa or more, excellent formability, and excellent coating adhesion and which includes a galvannealed layer disposed on a steel sheet containing 0.04% to 0.1% C, 0.4% to 2.0% Si, 1.5% to 3.0% Mn, 0.0005% to 0.005% B, 0.1% or less P, more than 4N to 0.05% Ti, and 0.1% or less Nb on a mass basis, the remainder being Fe and unavoidable impurities. The content of Fe in the galvannealed layer is 5% to 25%. The steel sheet has a multi-phase microstructure containing a ferritic phase and a martensitic phase.

Japanese Unexamined Patent Application Publication No. 11-279691 discloses a high-strength galvannealed steel sheet having good formability. The galvannealed steel sheet contains 0.05% to 0.15% C, 0.3% to 1.5% Si, 1.5% to 2.8% Mn, 0.03% or less P, 0.02% or less S, 0.005% to 0.5% Al, and 0.0060% or less N on a mass basis, the remainder being Fe and unavoidable impurities; satisfies the inequalities (Mn %)/(C %) ≥15 and (Si %)/(C %)≥4; and has a ferritic phase containing 3% to 20% by volume of a martensitic phase and a retained austenitic phase.

Japanese Unexamined Patent Application Publication No. 2002-69574 discloses a high-strength cold-rolled steel sheet and high-strength plated steel sheet having excellent stretch flangeability and low yield ratio. The high-strength cold-rolled steel sheet and the high-strength plated steel sheet contain 0.04% to 0.14% C, 0.4% to 2.2% Si, 1.2% to 2.4% Mn, 0.02% or less P, 0.01% or less S, 0.002% to 0.5% Al, 0.005% to 0.1% Ti, and 0.006% or less N on a mass basis, the remainder being Fe and unavoidable impurities; satisfy the inequality (Ti %)/(S %)≥5; have a martensite and retained austenite volume fraction of 6% or more; and satisfy the inequality α≤50000×{(Ti %)/48+(Nb %)/93+(Mo %)/96+(V %)/51}, where α is the volume fraction of a hard phase structure including a martensitic phase, a retained austenitic phase, and a bainitic phase.

Japanese Unexamined Patent Application Publication No. 2003-55751 discloses a high-strength galvanized steel sheet having excellent coating adhesion and elongation during molding. The high-strength galvanized steel sheet includes a plating layer disposed on a steel sheet containing 0.001% to 0.3% C, 0.01% to 2.5% Si, 0.01% to 3% Mn, and 0.001% to 4% Al on a mass basis, the remainder being Fe and unavoidable impurities, and which contains 0.001% to 0.5% Al and 0.001% to 2% Mn on a mass basis, the remainder being Zn and unavoidable impurities, and satisfies the inequality 0≤3−(X+Y/10+Z/3)−12.5×(A−B), where X is the Si content of the steel sheet, Y is the Mn content of the steel sheet, Z is the Al content of the steel sheet, A is the Al content of the plating layer, and B is the Mn content of the plating layer on a mass percent basis. The steel sheet has a microstructure containing a ferritic primary phase having a volume fraction of 70% to 97% and an average grain diameter of 20 μm or less and a secondary phase such as an austenitic phase and/or a martensitic phase, having a volume fraction of 3% to 30% and an average grain diameter of 10 μm or less.

However, for the high-strength cold-rolled steel sheets and the high-strength galvanized steel sheets disclosed in JP '147, JP '691, JP '574 and JP '751, excellent formability including stretch flangeability cannot be achieved if attempts are made to achieve a TS of 980 MPa or more. Furthermore, energy absorption during crash is not taken into account.

It could therefore be helpful to provide a high-strength galvanized steel sheet having a TS of 980 MPa or more, excellent formability including stretch flangeability, and excellent energy absorption (crashworthiness) during high-speed deformation and a method of manufacturing the same.

SUMMARY

We discovered high-strength galvanized steel sheets having a TS of 980 MPa or more, good ductility, good stretch flangeability, and excellent energy absorption during crash as described below:

(i) A TS of 980 MPa or more, good ductility, good stretch flangeability, and excellent energy absorption can be achieved such that a component composition satisfies a specific correlation and a tempered martensitic phase only or the tempered martensitic phase and a bainitic phase are contained such that the sum of the area fraction of the tempered martensitic phase and that of the bainitic phase is 30% or more and the distance of closest approach of the tempered martensitic phase is 10 μm or less.

(ii) That microstructure can be obtained by heating to a temperature not lower than the $Ac_1$ transformation temperature at an average heating rate of 5° C./s or more, heating is performed to $(Ac_3-50)°$ C. or higher at an average heating rate of less than 5° C./s, soaking is performed at a temperature of $(Ac_3-50)°$ C. to $(Ac_3+50)°$ C. for 30 s to 500 s, primary cooling is performed to a temperature of 600° C. or lower at an average cooling rate of 3° C./s to 30° C./s, galvanizing is performed, and secondary cooling is performed at a temperature of 200° C. to 400° C. at an average cooling rate of 15° C./s or less.

We thus provide:

(1) A high-strength galvanized steel sheet with excellent formability and crashworthiness has a component composition containing 0.03% to 0.13% C, 1.0% to 2.0% Si, 2.4% to 3.5% Mn, 0.001% to 0.05% P, 0.0001% to 0.01% S, 0.001% to 0.1% Al, 0.0005% to 0.01% N, and 0.0003% to 0.01% B on a mass basis, the remainder being Fe and unavoidable impurities, and a microstructure containing a tempered martensitic phase and a bainitic phase such that the sum of the area fraction of the tempered martensitic phase and the area fraction of the bainitic phase is 30% or more (the area fraction of the martensitic phase is 30% or more in the absence of the bainitic phase). The distance of closest approach of the tempered martensitic phase is 10 μm or less. The contents of C, Mn, and B satisfy the following inequality:

$$(\% \text{ Mn})+1000\times(\% \text{ B})\geq 35\times(\% \text{ C}) \qquad (1).$$

(2) In the high-strength galvanized steel sheet having excellent formability and crashworthiness specified in Item (1), the average grain diameter of the tempered martensitic phase is 2.0 μm or more.

(3) In the high-strength galvanized steel sheet having excellent formability and crashworthiness specified in Item (1) or (2), the component composition further contains at least one selected from the group consisting of 0.0005% to 0.1% Ti and 0.0005% to 0.05% Nb on a mass basis.

(4) In the high-strength galvanized steel sheet having excellent formability and crashworthiness specified in any one of Items (1) to (3), the component composition further contains at least one selected from the group consisting of 0.01% to 1.0% Cr, 0.01% to 1.0% Mo, 0.01% to 2.0% Ni, and 0.01% to 2.0% Cu on a mass basis.

(5) In the high-strength galvanized steel sheet having excellent formability and crashworthiness specified in any one of Items (1) to (4), the component composition further contains 0.001% to 0.005% Ca on a mass basis.

(6) In the high-strength galvanized steel sheet having excellent formability and crashworthiness specified in any one of Items (1) to (5), the high-strength galvanized steel sheet is a high-strength galvannealed steel sheet.

(7) A method of manufacturing a high-strength galvanized steel sheet having excellent formability and crashworthiness includes heating a steel sheet having the component composition specified in any one of Items (1) and (3) to (5) to a temperature not lower than the $Ac_1$ transformation temperature at an average heating rate of 5° C./s or more, heating the steel sheet to $(Ac_3-50)°$ C. or higher at an average heating rate of less than 5° C./s, soaking the steel sheet at a temperature of $(Ac_3-50)°$ C. to $(Ac_3+50)°$ C. for 30 s to 500 s, primarily cooling the steel sheet to a temperature of 600° C. or lower at an average cooling rate of 3° C./s to 30° C./s, galvanizing the steel sheet, and secondarily cooling the steel sheet to a temperature of 200° C. to 400° C. at an average cooling rate of 15° C./s or less.

(8) The method of manufacturing the high-strength galvanized steel sheet having excellent formability and crashworthiness specified in Item (7) includes holding the primarily cooled steel sheet at a temperature of 300° C. to 550° C. for 20 s to 150 s prior to galvanizing.

(9) The method of manufacturing the high-strength galvanized steel sheet having excellent formability and crashworthiness specified in Item (7) or (8) includes alloying a zinc coating of the galvanized steel sheet at a temperature of 450° C. to 600° C. prior to secondary cooling.

The following sheet can thus be manufactured: a high-strength galvanized steel sheet having a TS of 980 MPa or more, excellent formability including stretch flangeability, and excellent energy absorption during high-speed deformation. Application of a high-strength galvanized steel sheet according to structural parts of automobiles allows the crash safety of occupants to be enhanced and also allows fuel efficiency to be improved by automotive lightening.

DETAILED DESCRIPTION

The unit "%" used to express the content of each component or element refers to "% by mass" unless otherwise specified.

(1) Component Composition

C: 0.03% to 0.13%

C is an element which is important in hardening steel, has high solid solution hardening ability, and is essential to adjust the area fraction and hardness of a martensitic phase in the case of making use of microstructure strengthening due to the martensitic phase. When the content of C is less than 0.03%, it is difficult to achieve a desired area fraction of the martensitic phase and sufficient strength cannot be achieved because the martensitic phase is not hardened. However, when the content of C is more than 0.13%, weldability is deteriorated, the martensitic phase is excessively hardened, self-tempering is suppressed and, therefore, formability, particularly stretch flangeability, is reduced. Thus, the content of C is 0.03% to 0.13%.

Si: 1.0% to 2.0%

Si is an extremely important element. During annealing, Si promotes ferrite transformation and cleans a ferritic phase by discharging solute C from the ferritic phase into an austenitic phase to increase ductility. When annealing is performed even in a continuous galvanizing line in which quenching is difficult because the austenitic phase is stabilized, Si generates a martensitic phase to facilitate production of a multi-phase microstructure. Si reduces the difference in hardness between the ferritic phase and the martensitic phase by solid solution hardening of the ferritic phase, suppresses formation of cracks at the interface therebetween to improve local deformability, and contributes to an improvement in stretch flangeability. Furthermore, solute Si in the ferritic phase promotes work hardening to increase ductility, improves strain transmissivity of strain-concentrated regions to increase the stretch flangeability, and prevents local breakage during high-speed deformation. The content of Si needs to be 1.0% or more to achieve these effects. However, when the content of Si is more than 2.0%, these effects are saturated and serious problems relating to surface quality are caused. Thus, the content of Si is 1.0% to 2.0%.

Mn: 2.4% to 3.5%

Mn is effective in preventing thermal embrittlement of steel, is effective in ensuring the strength thereof, and increases hardenability thereof to facilitate production of a multi-phase microstructure. Mn increases the percentage of an untransformed austenitic phase during annealing, reduces the concentration of C, allows a martensitic phase produced in a cooling step during annealing or a cooling step subsequent to galvanizing to be readily self-tempered, reduces the hardness of the martensitic phase in a final microstructure, and suppresses local deformation to greatly contributes to an improvement in stretch flangeability. The addition of Mn reduces the transformation temperature to promote a reverse transformation of the martensitic phase to austenite during heating and densely distributes the martensitic phase. The content of Mn needs to be 2.4% or more to achieve these effects. However, when the content of Mn is more than 3.5%, formation of a segregation phase is significant and deterioration of formability is caused. Thus, the content of Mn is 2.4% to 3.5%.

P: 0.001% to 0.05%

P is an element which can be used depending on desired strength and which is effective in producing a multi-phase microstructure for the purpose of promoting ferrite transformation. The content of P needs to be 0.001% or more to achieve such an effect. However, when the content of P is more than 0.05%, weldability deteriorates and in the case of alloying a zinc coating, the alloying rate thereof is reduced and the quality of the zinc coating deteriorates. Thus, the content of P is 0.001% to 0.05%.

S: 0.0001% to 0.01%

S segregates to grain boundaries to embrittle steel during hot working and is present in the form of sulfides to reduce local deformability. Therefore, the content of S needs to be preferably 0.01% or less, more preferably 0.003% or less, and further more preferably 0.001% or less. However, the content of S needs to be 0.0001% or more because of technical constraints on production. Thus, the content of S is preferably 0.0001% to 0.01%, more preferably 0.0001% to 0.003%, and further more preferably 0.0001% to 0.001%.

Al: 0.001% to 0.1%

Al is an element which is effective in producing a ferritic phase to increase the balance between strength and ductility. The content of Al needs to be 0.001% or more to achieve such an effect. However, when the content of Al is more than 0.1%, surface quality is deteriorated. Thus, the content of Al is 0.001% to 0.1%.

N: 0.0005% to 0.01%

N is an element which deteriorates the aging resistance of steel. In particular, when the content of N is more than 0.01%, deterioration of aging resistance is significant. The content thereof is preferably small. However, the content of N needs to be 0.0005% or more because of technical constraints on production. Thus, the content of N is 0.0005% to 0.01%.

B: 0.0003% to 0.01%

B increases weldability to facilitate production of a multi-phase microstructure. Furthermore, B suppresses diffusional transformation of ferrite, pearlite, and the like during cooling to increase the percentage of an untransformed austenitic phase, reduces the concentration of C therein, allows a martensitic phase produced in a cooling step during annealing or a cooling step subsequent to galvanizing to be readily self-tempered, reduces the hardness of the martensitic phase in a final microstructure, and suppresses local deformation to greatly contribute to an improvement in stretch flangeability. The content of B needs to be 0.0003% or more to achieve these effects. However, when the content of B is more than 0.01%, the reduction of ductility is caused. Thus, the content of B is 0.0003% to 0.01%.

$$(\% \text{ Mn}) + 1000 \times (\% \text{ B}) 35 \times (\% \text{ C})$$

A tempered martensitic phase is produced principally by self-tempering occurring simultaneously with martensite transformation in a secondary cooling step subsequent to galvanizing. The concentration of C in untransformed austenite is preferably small such that the Ms temperature is increased to efficiently produce the tempered martensitic phase. A bainitic phase is produced in a primary cooling step or subsequent holding step subsequent to soaking. The concentration of C is preferably small such that untransformed austenite is not stabilized to efficiently produce the bainitic phase.

Thus, to achieve the tempered martensitic phase and the bainitic phase at a predetermined ratio, the amount of untransformed austenite during annealing and the concentration of C therein need to be adjusted. The amount of untransformed austenite can be adjusted such that the transformation temperature is controlled with contained elements. In particular, the content of each of Mn and B, which have a significant influence, needs to be strictly controlled. The concentration of C in untransformed austenite strongly depends on the content of C in steel and the amount of untransformed austenite because C tends to be distributed in untransformed austenite during soaking. In consideration of these, to achieve the tempered martensitic phase and the bainitic phase at a predetermined ratio within the above component composition, the content of each of Mn, B, and C needs to be controlled within a range given by the following empirical inequality:

$$(\% \text{ Mn}) + 1000 \times (\% \text{ B}) 35 \times (\% \text{ C}).$$

The remainder is Fe and unavoidable impurities. The following element is preferably contained because of reasons below: at least one of 0.0005% to 0.1% Ti and 0.0005% to 0.05% Nb; at least one selected from the group consisting of 0.01% to 1.0% Cr, 0.01% to 1.0% Mo, 0.01% to 2.0% Ni, and 0.01% to 2.0% Cu; or 0.001% to 0.005% Ca.

Ti: 0.0005% to 0.1%

Ti forms precipitates together with C, S, and N to effectively contribute to enhancement of strength and toughness. Furthermore, Ti strengthens steel by precipitation hardening and therefore may be used depending on desired strength. When Ti and B are both contained, precipitation of BN is suppressed because Ti precipitates N in the form of TiN. Hence, the above effects due to B are effectively expressed. The content of Ti needs to be 0.0005% or more to achieve such effects. However, when the content of Ti is more than 0.1%, precipitation hardening proceeds excessively to cause a reduction in ductility. Thus, the content of Ti is 0.0005% to 0.1%.

Nb: 0.0005% to 0.05%

Nb strengthens steel by precipitation hardening and therefore can be used depending on desired strength. The content of Nb needs to be 0.0005% or more to achieve such an effect. When the content of Nb is more than 0.05%, precipitation hardening proceeds excessively to cause a reduction in ductility. Thus, the content of Nb is 0.0005% to 0.05%.

Cr, Mo, Ni, and Cu: 0.01% to 1.0%, 0.01% to 1.0%, 0.01% to 2.0%, and 0.01% to 2.0%, respectively Cr, Mo, Ni, and Cu function as precipitation-hardening elements and stabilize an austenitic phase in a cooling step during annealing to facilitate production of a multi-phase microstructure. The content of each of Cr, Mo, Ni, and Cu needs to be 0.01% or more to achieve such an effect. However, when the content of Cr, Mo, Ni, or Cu is more than 1.0%, 1.0%, 2.0%, or 2.0%, respectively, wettability, formability, and/or spot weldability is deteriorated. Thus, the content of Cr is 0.01% to 1.0%, the content of Mo is 0.01% to 1.0%, the content of Ni is 0.01% to 2.0%, and the content of Cu 0.01% to 2.0%.

Ca: 0.001% to 0.005%

Ca precipitates S in the form of CaS to prevent production of MnS, which causes creation and propagation of cracks and, therefore, has the effect of enhancing stretch flangeability and bendability. The content of Ca needs to be 0.001% or more to achieve this effect. However, when the content of Ca is more than 0.005%, this effect is saturated. Thus, the content of Ca is 0.001% to 0.005%.

(2) Microstructure

Sum of area fractions of martensitic phase and bainitic phase (or area fraction of martensitic phase in the absence of bainitic phase): 30% or more A microstructure contains a martensitic phase to achieve a strength of 980 MPa. To improve local deformability such as stretch flangeability and to increase strain transmissivity during high-speed deformation, the martensitic phase needs to include a tempered martensitic phase which is relatively soft. Such an effect can be achieved even if the tempered martensitic phase is partly replaced with a bainitic phase. The sum of the area fractions of the martensitic phase and bainitic phase in the microstructure needs to be 30% or more (the area fraction of the martensitic phase needs to be 30% or more in the absence of the bainitic phase) to efficiently express these effects. The martensitic phase can include an untempered martensitic phase. When the microstructure contains both the tempered martensitic phase and the bainitic phase, the percentage of the tempered martensitic phase in the microstructure is preferably 10% or more in view of strength.

The term "untempered martensitic phase" as used herein is a texture which has the same chemical composition as that of an untransformed austenitic phase and a body-centered cubic structure and in which C is supersaturatedly dissolved and refers to a hard phase having a microstructure such as a lath, a packet, or a block and high dislocation density. The term "tempered martensitic phase" as used herein refers to a ferritic phase in which supersaturated solute C is precipitated from a martensitic phase in the form of carbides, in which the microstructure of a parent phase is maintained, and which has high dislocation density. The tempered martensitic phase need not be distinguished from others depending on thermal history such as quench annealing or self-tempering to obtain the tempered martensitic phase.

Distance of closest approach of tempered martensitic phase: 10 μm or less

When the tempered martensitic phase is coarse and sparsely distributed even though the tempered martensitic phase satisfies the above-mentioned area fraction, cracks are likely to propagate along the interface between the tempered martensitic phase and a neighboring phase, ductility during high-speed deformation is particularly reduced, and sufficient energy absorption cannot be achieved. When the tempered martensitic phase is fine and densely distributed, tempered martensitic grains resist propagation of cracks, ductility during high-speed deformation is particularly increased, and energy absorption is increased. The distance of closest approach of the tempered martensitic phase needs to be 10 μm or less to sufficiently achieve these effects.

Average grain diameter of tempered martensitic phase: 2.0 μm or more

When the grain diameter of the tempered martensitic phase is extremely small, origins of local cracks are dense and therefore local deformability is likely to be reduced. Hence, the average grain diameter thereof is preferably 2.0 μm or more.

A main phase other than the above phases is preferably a ferritic phase. If a retained austenitic phase or a pearlitic phase is contained in addition to the ferritic phase, positive effects are not impaired.

The area fraction of each phase is herein defined as the percentage of the area of the phase in the area of an observed field of view. In our steel sheet, the area fraction thereof may be treated the same as the volume fraction thereof because the microstructure is three-dimensionally uniform. The area fraction and distance of closest approach of the phase and the average grain diameter of the tempered martensitic phase can be determined with a commercially available image-processing software program (for example, Image-Pro available from Media Cybernetics) such that a widthwise surface of a steel sheet parallel to the rolling direction of the steel sheet is polished and then corroded with 3% nital and ten fields of view thereof are observed with a SEM (scanning electron microscope) at 2000 times magnification. The untempered martensitic phase and the tempered martensitic phase can be distinguished from each other from the morphology of a nital-corroded surface. That is, the untempered martensitic phase has a flat surface and the tempered martensitic phase has structures (irregularities) caused by corrosion as observed in crystal grains. The untempered martensitic phase and the tempered martensitic phase are identified for each crystal grain by this method. In particular, the area fraction of the untempered or tempered martensitic phase is determined such that the untempered or tempered martensitic phase is identified from a microstructure photograph taken with the SEM and the photograph is binarized for each phase.

The average grain diameter of the tempered martensitic phase is determined such that the equivalent circle diameters of individual crystal grains are calculated and then averaged.

The distance of closest approach of the tempered martensitic phase can be determined such that the number of tempered martensitic grains per unit volume is determined by dividing the area fraction of the tempered martensitic phase by the area fraction of each tempered martensitic grain, the average area occupied by one tempered martensitic grain is calculated, and the cubic root thereof determined. That is, the distance of closest approach thereof is calculated from the following equation:

$$L_{TM} = (d_M/2) \times (4\pi/3f)^{1/3}$$

where $L_{TM}$ is the distance of closest approach, $d_M$ is the average grain diameter of the tempered martensitic phase, and f is the area fraction of the tempered martensitic phase.

(3) Manufacturing Conditions

Our high-strength galvanized steel sheet can be manufactured by the following method: for example, a steel sheet having the above composition is annealed such that the steel sheet is heated to a temperature not lower than the $Ac_1$ transformation temperature thereof at an average heating rate of 5° C./s or more, further heated to a temperature not lower than $(Ac_3-50)°$ C. at an average heating rate of less than 5° C./s, soaked at a temperature of $(Ac_3-50)°$ C. to $(Ac_3+50)°$ C. for 30 s to 500 s, and then primarily cooled to a temperature of 600° C. or lower at an average cooling rate of 3° C./s to 30° C./s; the annealed steel sheet is galvanized; and the galvanized steel sheet is secondarily cooled to a temperature of 200° C. to 400° C. at an average cooling rate of 15° C./s or less as described above.

Heating Conditions 1 during annealing: heating to a temperature not lower than the $Ac_1$ transformation temperature at an average heating rate of 5° C./s or more Production of a recovered or recrystallized ferritic phase can be suppressed and austenite transformation can be carried out by heating the steel sheet to a temperature not lower than the $Ac_1$ transformation temperature at an average heating rate of 5° C./s or more. Hence, the percentage of an austenitic phase is increased and a martensitic phase with a predetermined area fraction is likely to be finally obtained. Furthermore, the martensitic phase can be uniformly dispersed and therefore the distance of closest approach of a tempered martensitic phase can be reduced. This allows necessary strength to be ensured, stretch flangeability to be enhanced, and absorbed energy during high-speed deformation to be increased. When the average rate of heating the steel sheet to the $Ac_1$ transformation temperature is less than 5° C./s or the heating temperature thereof is lower than the $Ac_1$ transformation temperature, recovery or recrystallization proceeds excessively and therefore it is difficult to accomplish the necessary area fraction of the tempered martensitic phase, that of a bainitic phase, and the predetermined distance of closest approach of the tempered martensitic phase.

Heating Conditions 2 during annealing: heating to $(Ac_3-50)°$ C. at an average heating rate of less than 5° C./s The austenitic phase needs to be grown to an appropriate size in the course from heating to soaking to accomplish the predetermined area fraction and grain diameter of the martensitic phase. However, when the average heating rate is large at high temperatures, the austenitic phase is finely dispersed and therefore individual austenitic phases cannot be grown. Hence, it is difficult to allow the martensitic phase to have a predetermined area fraction in a final microstructure. Therefore, the average heating rate is less than 5° C./s at high temperatures not lower than $(Ac_3-50)°$ C. When the heating temperature is low, untransformed austenite is not grown even if the heating rate is low. Hence, the predetermined area fraction of the tempered martensitic phase cannot be accomplished. Therefore, the heating temperature is $(Ac_3-50)°$ C. or higher.

Soaking conditions during annealing: soaking at a temperature of $(Ac_3-50)°$ C. to $(Ac_3+50)°$ C. for 30 s to 500 s The increase of the percentage of the austenitic phase during soaking reduces the content of C in the austenitic phase to increase the Ms temperature, provides a self-tempering effect in a cooling step subsequent to galvanizing, and allows sufficient strength to be accomplished even if the hardness of the martensitic phase is reduced by tempering. Hence, a TS of 980 MPa or more, excellent stretch flangeability, and high absorbed energy during high-speed deformation can be achieved. However, when the soaking temperature is higher than $(Ac_3+50)°$ C., the grain diameter of untransformed austenite is increased and therefore the predetermined distance of closest approach cannot be satisfied. When the soaking time is less than 30 s, untransformed austenite is not sufficiently grown and therefore the predetermined area fraction and/or grain diameter of the martensitic phase cannot be accomplished. However, when the soaking time is more than 500 s, an effect is saturated and manufacturing efficiency is inhibited.

Cooling conditions during annealing: cooling to a temperature of 600° C. or lower from the soaking temperature at an average cooling rate of 3° C./s to 30° C./s (primary cooling)

After the steel sheet is soaked, the steel sheet needs to be cooled to a temperature (cooling stop temperature) of 600° C. or lower from the soaking temperature at an average cooling rate of 3° C./s to 30° C./s. This is because when the average cooling rate is less than 3° C./s, a sufficient area fraction of an untransformed austenitic phase is not obtained since ferrite transformation proceeds during cooling, a self-tempering effect is unlikely to be achieved since C is concentrated in an untransformed austenitic phase, it is difficult to obtain the tempered martensitic phase at a predetermined area fraction and distance of closest approach in a final microstructure, and a reduction in stretch flangeability and a reduction in energy absorption are caused. When the average cooling rate is more than 30° C./s, the effect of suppressing ferrite transformation is saturated and it is difficult for common production facilities to accomplish such a rate. The reason why the cooling stop temperature is set to 600° C. or lower is that when the cooling stop temperature is higher than 600° C., the ferritic phase is significantly produced during cooling and it is difficult to obtain the tempered martensitic phase and the bainitic phase at a predetermined area fraction.

After annealing is performed, galvanizing is performed under ordinary conditions. Heat treatment is preferably performed prior to galvanizing as described below.

Conditions of heat treatment subsequent to annealing: heat treatment at a temperature of 300° C. to 550° C. for 20 s to 150 s Heat treatment is performed at a temperature of 300° C. to 550° C. for 20 s to 150 s subsequent to annealing, whereby reduction in hardness of the martensitic phase can be promoted by self-tempering or the difference in hardness between phases can be efficiently reduced by producing the bainitic phase and therefore stretch flangeability and energy absorption during high-speed deformation can be further improved. Such effects are small when the heat treatment temperature is lower than 300° C. or the heat treatment time is less than 20 s. However, when the heat treatment temperature is higher than 550° C., transformation of a ferritic phase and/or a pearlitic phase proceeds and self-tempering of martensite is inhibited because the concentration of C is excessive. Hence, it is difficult to obtain a predetermined fraction of the tempered martensitic phase in a final microstructure. Such an effect is saturated and manufacturing efficiency is inhibited when the heat treatment time is more than 150 s.

Cooling conditions after galvanizing: cooling to a temperature of 200° C. to 400° C. at an average cooling rate of 15° C./s or less (secondary cooling)

After galvanizing is performed, secondary cooling needs to be performed at a temperature of 200° C. to 400° C. at an average cooling rate of 15° C./s or less. This is because the residence time in a temperature region where self-tempering occurs is ensured. Since martensite transformation does not occur sufficiently at a temperature of higher than 400° C. or any element is not diffused at a temperature of lower than 200° C., self-tempering does not proceed sufficiently even though the average cooling rate is 15° C./s or less. However, when the average cooling rate is more than 15° C./s, the time necessary to allow self-tempering to proceed sufficiently cannot be ensured even if martensite transformation occurs.

In alloying a zinc coating, the zinc coating may be alloyed at a temperature of 450° C. to 600° C. prior to secondary cooling after galvanizing independently of whether heat treatment is performed at a temperature of 300° C. to 550° C. as described above. Alloying the zinc coating at a temperature of 450° C. to 600° C. allows the concentration of Fe in the coating to be 8% to 12% and enhances adhesion and corrosion resistance of the coating after painting. At lower than 450° C., alloying does not sufficiently proceed and therefore a reduction in galvanic action and/or a reduction in slidability is caused. At higher than 600° C., alloying excessively proceeds and therefore powdering properties are reduced. Furthermore, a large amount of the ferritic phase and/or the pearlitic phase is produced and therefore an increase in strength cannot be achieved.

Other manufacturing conditions are not particularly limited and are preferably as described below.

The unannealed steel sheet used to manufacture the high-strength galvanized steel sheet is manufactured such that a slab having the above composition is hot-rolled and then cold-rolled to a desired thickness. In view of manufacturing efficiency, the high-strength galvanized steel sheet is preferably manufactured with a continuous galvanizing line capable of performing a series of treatments such as annealing prior to galvanizing, heat treatment, galvanizing, and alloying the zinc coating.

The slab is preferably manufactured by a continuous casting process for the purpose of preventing macro-segregation and may be manufactured by an ingot making process or a thin slab-casting process. The slab is reheated when the slab is hot-rolled. The reheating temperature thereof is preferably 1150° C. or higher to prevent an increase in rolling load. The upper limit of the reheating temperature thereof is preferably 1300° C. to prevent an increase in scale loss and an increase in fuel unit consumption.

Hot rolling includes rough rolling and finish rolling. Finish rolling is preferably performed at a finishing temperature not lower than the $Ar_3$ transformation temperature to prevent a reduction in formability after cold rolling and annealing. The finishing temperature is preferably 950° C. or lower to prevent the unevenness of a microstructure due to the coarsening of grains or to prevent scale defects.

The hot-rolled steel sheet is preferably coiled at a coiling temperature of 500° C. to 650° C. for the purpose of preventing scale defects or ensuring good shape stability.

After the coiled steel sheet is descaled by pickling or the like, the coiled steel sheet is preferably cold-rolled at a rolling reduction of 40% or more for the purpose of efficiently producing a polygonal ferritic phase.

A galvanizing bath containing 0.10% to 0.20% Al is preferably used for galvanizing. After galvanizing is performed, wiping may be performed for the purpose of adjusting the area weight of the coating.

EXAMPLES

Steel Nos. A to M having compositions shown in Table 1 were produced in a vacuum melting furnace and then converted into sheet bar slabs by slabbing. After being heated to 1200° C., the sheet bar slabs were hot-rolled at a finishing temperature of 850° C. to 920° C. (not lower than the $Ar_3$ transformation temperature). The hot-rolled steel sheets were coiled at a coiling temperature of 600° C. After being pickled, the hot-rolled steel sheets were cold-rolled to thicknesses shown in Table 2 at a rolling reduction of 50%. The cold-rolled steel sheets were annealed in an infrared furnace under annealing conditions shown in Table 2 and then primarily cooled. Zinc coatings with a mass per unit area of 45 g/m² were formed on the steel sheets by dipping the steel sheets in a 475° C. zinc plating bath containing 0.13% Al for 3 s, some of the steel sheets being heat-treated under conditions shown in Table 2 in advance, and were then alloyed at temperatures shown in Table 2. Subsequently, the steel sheets were secondarily cooled to a temperature of 200° C. to 400° C. at average cooling rates shown in Table 2, whereby Galvanized Steel Sheet Nos. 1 to 23 were prepared. As shown in Table 2, some of the galvanized steel sheets were not alloyed.

TABLE 1

| Steel No. | C | Si | Mn | P | S | Al | N | B | Ti | Nb | Cr |
|---|---|---|---|---|---|---|---|---|---|---|---|
| A | 0.067 | 1.23 | 3.21 | 0.008 | 0.0019 | 0.031 | 0.0016 | 0.0027 | 0 | 0 | 0 |
| B | 0.124 | 1.11 | 2.54 | 0.011 | 0.0008 | 0.019 | 0.0021 | 0.0031 | 0 | 0 | 0 |
| C | 0.107 | 1.71 | 2.65 | 0.012 | 0.0021 | 0.031 | 0.0041 | 0.0019 | 0.021 | 0 | 0 |
| D | 0.085 | 1.51 | 2.77 | 0.011 | 0.0018 | 0.026 | 0.0031 | 0.0024 | 0.055 | 0.014 | 0 |
| E | 0.111 | 1.36 | 2.61 | 0.009 | 0.0016 | 0.022 | 0.0028 | 0.0014 | 0.012 | 0 | 0.21 |
| F | 0.079 | 1.82 | 2.84 | 0.011 | 0.0023 | 0.039 | 0.0015 | 0.0016 | 0 | 0 | 0 |
| G | 0.053 | 1.47 | 3.02 | 0.017 | 0.0007 | 0.038 | 0.0021 | 0.0041 | 0 | 0 | 0 |
| H | 0.024 | 1.63 | 3.25 | 0.010 | 0.0009 | 0.033 | 0.0022 | 0.0010 | 0 | 0 | 0 |
| I | 0.082 | 0.69 | 2.70 | 0.012 | 0.0021 | 0.014 | 0.0042 | 0.0035 | 0 | 0 | 0 |
| J | 0.061 | 1.75 | 2.01 | 0.006 | 0.0011 | 0.020 | 0.0043 | 0.0018 | 0 | 0 | 0 |
| K | 0.108 | 1.56 | 2.99 | 0.011 | 0.0015 | 0.016 | 0.0047 | 0 | 0 | 0 | 0 |
| L | 0.162 | 1.48 | 3.27 | 0.018 | 0.0018 | 0.026 | 0.0017 | 0.0025 | 0.021 | 0.042 | 0 |
| M | 0.090 | 1.12 | 3.82 | 0.013 | 0.0022 | 0.036 | 0.0032 | 0.0026 | 0.035 | 0 | 0.41 |

| | | | | | (% by mass) | | | |
|---|---|---|---|---|---|---|---|---|
| Steel No. | Mo | Ni | Cu | Ca | $Ac_1$ (° C.) | $Ac_3$ (° C.) | $Ac_3 - 50$ (° C.) | $Ac_3 + 50$ (° C.) | Remarks |
| A | 0 | 0 | 0 | 0 | 645 | 846 | 796 | 896 | Inventive Steel |
| B | 0 | 0 | 0 | 0 | 651 | 824 | 774 | 874 | Inventive Steel |
| C | 0 | 0 | 0 | 0 | 660 | 865 | 815 | 915 | Inventive Steel |
| D | 0 | 0 | 0 | 0 | 659 | 867 | 817 | 917 | Inventive Steel |

TABLE 1-continued

| | | | | | | | | | |
|---|---|---|---|---|---|---|---|---|---|
| E | 0.24 | 0 | 0 | 0 | 667 | 846 | 796 | 896 | Inventive Steel |
| F | 0 | 0.16 | 0.29 | 0 | 649 | 869 | 819 | 919 | Inventive Steel |
| G | 0 | 0 | 0 | 0.0021 | 650 | 875 | 825 | 925 | Inventive Steel |
| H | 0 | 0 | 0 | 0 | 654 | 880 | 830 | 930 | Comparative Steel |
| I | 0 | 0 | 0 | 0 | 643 | 817 | 767 | 867 | Comparative Steel |
| J | 0 | 0 | 0 | 0 | 671 | 896 | 846 | 946 | Comparative Steel |
| K | 0 | 0 | 0 | 0 | 657 | 837 | 787 | 887 | Comparative Steel |
| L | 0 | 0 | 0 | 0 | 657 | 813 | 763 | 863 | Comparative Steel |
| M | 0.16 | 0 | 0 | 0 | 648 | 826 | 776 | 876 | Comparative Steel |

TABLE 2

| Galvanized steel sheet No. | Steel No. | Thickness (mm) | Annealing | | | | | | | Heat treatment | | | Secondary cooling rate (° C./s) |
|---|---|---|---|---|---|---|---|---|---|---|---|---|---|
| | | | Heating 1 | | Heating 2 | Soaking | | Primary cooling | | Holding | | Alloying | |
| | | | Average rate (° C./s) | Temperature (° C.) | Average rate (° C./s) | Temperature (° C.) | Time (s) | Average rate (° C./s) | Stop temperature (° C.) | temperature (° C.) | Holding time (s) | temperature (° C.) | |
| 1 | A | 1.4 | 15.0 | 740 | 1.0 | 860 | 90 | 8.0 | 530 | 500 | 50 | 520 | 6 |
| 2 | | 1.4 | 3.0 | 740 | 1.0 | 860 | 90 | 8.0 | 530 | 500 | 50 | 530 | 6 |
| 3 | | 1.4 | 15.0 | 600 | 1.0 | 860 | 90 | 8.0 | 530 | 500 | 50 | 550 | 6 |
| 4 | | 1.4 | 15.0 | 740 | 1.0 | 780 | 90 | 8.0 | 530 | 500 | 50 | 530 | 6 |
| 5 | | 1.4 | 15.0 | 740 | 1.0 | 860 | 10 | 8.0 | 530 | 500 | 50 | 520 | 6 |
| 6 | | 1.4 | 15.0 | 740 | 1.0 | 860 | 90 | 1.0 | 530 | 500 | 50 | 520 | 6 |
| 7 | | 1.4 | 15.0 | 740 | 1.0 | 860 | 90 | 8.0 | 580 | 580 | 50 | 520 | 6 |
| 8 | | 1.4 | 15.0 | 740 | 1.0 | 860 | 90 | 8.0 | 530 | 500 | 50 | 520 | 20 |
| 9 | B | 1.6 | 15.0 | 720 | 1.0 | 860 | 90 | 8.0 | 540 | 500 | 50 | 520 | 6 |
| 10 | | 1.6 | 15.0 | 720 | 10.0 | 860 | 90 | 8.0 | 540 | 500 | 50 | 530 | 6 |
| 11 | | 1.6 | 15.0 | 720 | 1.0 | 900 | 90 | 8.0 | 540 | 500 | 50 | 520 | 6 |
| 12 | | 1.6 | 15.0 | 720 | 1.0 | 860 | 90 | 8.0 | 620 | 500 | 50 | 520 | 6 |
| 13 | C | 1.4 | 15.0 | 740 | 1.0 | 820 | 90 | 8.0 | 540 | 500 | 50 | 550 | 6 |
| 14 | D | 2.3 | 10.0 | 700 | 0.5 | 820 | 130 | 5.0 | 500 | — | — | 540 | 4 |
| 15 | E | 1.6 | 15.0 | 750 | 1.0 | 800 | 90 | 8.0 | 540 | 500 | 50 | — | 6 |
| 16 | F | 1.2 | 20.0 | 740 | 1.5 | 860 | 70 | 10.0 | 510 | 500 | 35 | 540 | 8 |
| 17 | G | 1.4 | 15.0 | 710 | 1.0 | 860 | 90 | 8.0 | 540 | 500 | 50 | 540 | 6 |
| 18 | H | 1.2 | 20.0 | 720 | 1.5 | 870 | 70 | 10.0 | 500 | 500 | 35 | 530 | 8 |
| 19 | I | 1.4 | 15.0 | 710 | 1.0 | 810 | 90 | 8.0 | 510 | 500 | 50 | 540 | 6 |
| 20 | J | 1.4 | 15.0 | 700 | 1.0 | 870 | 90 | 8.0 | 530 | 500 | 50 | 550 | 6 |
| 21 | K | 1.6 | 15.0 | 760 | 1.0 | 820 | 90 | 8.0 | 530 | 500 | 50 | 550 | 6 |
| 22 | L | 1.6 | 10.0 | 740 | 0.5 | 840 | 130 | 5.0 | 500 | 500 | 75 | 520 | 4 |
| 23 | M | 1.6 | 15.0 | 720 | 1.0 | 820 | 90 | 8.0 | 530 | 500 | 50 | 540 | 6 |

The obtained galvanized steel sheets were measured for the area fraction of a ferritic phase, the area fraction of a tempered martensitic phase, the area fraction of a bainitic phase, the sum of the area of the tempered martensitic phase and the area of the bainitic phase, and the average grain diameter and distance of closest approach of the tempered martensitic phase by the methods described herein. JIS #5 tensile specimens perpendicular to the rolling direction were taken and then measured for TS and elongation El such that the specimens were subjected to a tensile test at a cross-head speed of 20 mm/min in accordance with JIS Z 2241. Furthermore, specimens with a size of 100 mm×100 mm were taken and then measured for average hole expansion ratio λ (%) such that these specimens were subjected to a hole-expanding test in accordance with JFS T 1001 (The Japan Iron and Steel Federation standard) three times, whereby these specimens were evaluated for stretch flangeability. High-speed deformation properties were evaluated such that a stress-strain curve was determined by performing a test at a strain rate of 2000/s using a high-speed tensile testing machine, absorbed energy was determined at a nominal strain of up to 15%, and a value obtained by dividing the absorbed energy by TS was used for evaluation. A high-speed tensile test was performed in accordance with a method specified in *Tetsu-to-Hagane,* vol. 83 (1997), p. 748. Results are shown in Table 3.

TABLE 3

| Galvanized steel sheet No. | Steel No. | Microstructure Area fraction of ferritic phase (%) | Area fraction of tempered martensitic phase (%) | Area fraction of bainitic phase (%) | Sum of area fraction of tempered martensitic phase and area fraction of bainitic phase (%) | Distance of closest approach of tempered martensitic phase (μm) | Average Grain diameter of tempered martensitic phase (μm) | Tensile properties TS (MPa) | El (%) | TS × El (MPa %) | λ (%) | 15% Absorption energy/ TS | Remarks |
|---|---|---|---|---|---|---|---|---|---|---|---|---|---|
| 1 | A | 61 | 28 | 10 | 38 | 6.9 | 2.1 | 1059 | 18 | 19062 | 66 | 0.16 | Example |
| 2 |   | 75 | 11 | 0 | 11 | 11.4 | 1.6 | 956 | 20 | 19120 | 19 | 0.11 | Comparative Example |
| 3 |   | 72 | 16 | 0 | 16 | 10.5 | 1.8 | 967 | 20 | 19340 | 21 | 0.13 | Comparative Example |
| 4 |   | 77 | 0 | 0 | 0 | — | — | 951 | 20 | 19020 | 18 | 0.12 | Comparative Example |
| 5 |   | 58 | 22 | 0 | 22 | 7.2 | 1.8 | 1082 | 15 | 16230 | 26 | 0.11 | Comparative Example |
| 6 |   | 75 | 3 | 0 | 3 | 13.6 | 1.7 | 959 | 20 | 19180 | 24 | 0.13 | Comparative Example |
| 7 |   | 65 | 16 | 2 | 18 | 7.6 | 2.6 | 1079 | 16 | 17264 | 22 | 0.11 | Comparative Example |
| 8 |   | 61 | 0 | 10 | 10 | — | — | 1119 | 16 | 17904 | 14 | 0.11 | Comparative Example |
| 9 | B | 51 | 36 | 11 | 47 | 5.5 | 3.6 | 1232 | 17 | 20944 | 45 | 0.16 | Example |
| 10 |   | 56 | 13 | 0 | 13 | 6.2 | 1.6 | 1310 | 12 | 15720 | 17 | 0.11 | Comparative Example |
| 11 |   | 8 | 41 | 48 | 89 | 15.2 | 4.8 | 1179 | 13 | 15327 | 49 | 0.12 | Comparative Example |
| 12 |   | 62 | 14 | 11 | 25 | 5.8 | 3.8 | 1192 | 13 | 15496 | 38 | 0.13 | Comparative Example |
| 13 | C | 41 | 35 | 21 | 56 | 5.4 | 3.4 | 1250 | 15 | 18750 | 49 | 0.16 | Example |
| 14 | D | 64 | 26 | 7 | 33 | 5.4 | 2.8 | 1085 | 17 | 18445 | 40 | 0.14 | Example |
| 15 | E | 57 | 37 | 0 | 37 | 3.5 | 3.8 | 1176 | 17 | 19992 | 54 | 0.17 | Example |
| 16 | F | 65 | 28 | 2 | 30 | 5.8 | 2.6 | 1067 | 18 | 19206 | 57 | 0.17 | Example |
| 17 | G | 59 | 24 | 16 | 40 | 4.2 | 2.3 | 1058 | 18 | 19044 | 67 | 0.17 | Example |
| 18 | H | 74 | 11 | 0 | 11 | 13.0 | 2.2 | 907 | 17 | 15419 | 48 | 0.14 | Comparative Example |
| 19 | I | 57 | 0 | 14 | 14 | 3.2 | 2.3 | 970 | 16 | 15520 | 34 | 0.13 | Comparative Example |
| 20 | J | 77 | 5 | 0 | 5 | 11.8 | 2.2 | 972 | 20 | 19440 | 24 | 0.16 | Comparative Example |
| 21 | K | 65 | 27 | 0 | 27 | 6.7 | 2.5 | 1125 | 14 | 15750 | 31 | 0.14 | Comparative Example |
| 22 | L | 45 | 5 | 0 | 5 | 6.6 | 1.4 | 1472 | 10 | 14720 | 15 | 0.15 | Comparative Example |
| 23 | M | 38 | 20 | 0 | 20 | 5.5 | 1.9 | 1349 | 12 | 16188 | 12 | 0.16 | Comparative Example |

Galvanized steel sheets of our Examples have a TS of 980 MPa or more and a hole expansion ratio λ of 40% or more, satisfy the inequality TS×El≥18000 MPa·% and, therefore, are excellent in formability. In the galvanized steel sheets, the value obtained by dividing the absorbed energy determined at a strain of up to 15% by TS is 0.14 or more. This shows that the galvanized steel sheets are high-strength galvanized steel sheets having excellent energy absorption during high-speed deformation.

INDUSTRIAL APPLICABILITY

The following sheet can be manufactured: a high-strength galvanized steel sheet having a TS of 980 MPa or more, excellent formability including stretch flangeability, and excellent energy absorption during high-speed deformation. The application of a high-strength galvanized steel sheet to structural parts of automobiles allows the crash safety of occupants to be ensured and also allows fuel efficiency to be improved by automotive lightening.

What is claimed is:
1. A galvanized steel sheet having formability and crashworthiness, consisting of 0.03% to 0.13% C, 1.0% to 2.0% Si, 2.4% to 3.5% Mn, 0.001% to 0.05% P, 0.0001% to 0.01% S, 0.001% to 0.1% Al, 0.0005% to 0.01% N, and 0.0003% to 0.01% B on a mass basis; and optionally containing at least one selected from the following A-C:
  A: at least one selected from the group consisting of 0.0005% to 0.1% Ti and 0.0005% to 0.05% Nb on a mass basis;
  B: at least one selected from the group consisting of 0.01% to 1.0% Mo, 0.01% to 2.0% Ni, and 0.01% to 2.0% Cu on a mass basis; and
  C: 0.001% to 0.005% Ca on a mass basis;
  the remainder being Fe and unavoidable impurities, and a microstructure containing a tempered martensitic phase and a bainitic phase such that the sum of an area fraction of the tempered martensitic phase and an area fraction of the bainitic phase is 30% or more, the area fraction of the tempered martensitic phase is 30% or more in the absence of the bainitic phase, wherein an average grain diameter of the tempered martensitic phase is 3.4 μm or more and a distance of closest approach of the tempered martensitic phase is 10 μm or less and contents of C, Mn, and B satisfy (1):

$$(\% Mn) + 1000 \times (\% B) \geq 35 \times (\% C) \qquad (1).$$

2. The galvanized steel sheet according to claim 1, wherein the galvanized steel sheet is a galvannealed steel sheet.

3. The galvanized steel sheet according to claim 1, wherein the galvanized steel sheet has a TS of 980 MPa or more.

4. The galvanized steel sheet according to claim 1, wherein the galvanized steel sheet satisfies $$TS \times El \geq 18{,}000 \text{ MPa} \cdot \%.$$

5. The galvanized steel sheet according to claim 1, wherein the galvanized steel sheet has a λ of 40% or more.

* * * * *